United States Patent
Arai et al.

(10) Patent No.: US 11,320,046 B2
(45) Date of Patent: May 3, 2022

(54) POWER TRANSMISSION APPARATUS

(71) Applicant: HONDA MOTOR CO., LTD., Tokyo (JP)

(72) Inventors: Dai Arai, Tokyo (JP); Toshimasa Mitsubori, Tokyo (JP); Hayato Yoshida, Tokyo (JP); Yohei Endo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 16/868,155

(22) Filed: May 6, 2020

(65) Prior Publication Data
US 2020/0378496 A1 Dec. 3, 2020

(30) Foreign Application Priority Data

May 30, 2019 (JP) .............................. JP2019-101324

(51) Int. Cl.
*F16H 25/12* (2006.01)
*F16H 63/30* (2006.01)
*F16H 25/20* (2006.01)

(52) U.S. Cl.
CPC ......... *F16H 63/3026* (2013.01); *F16H 25/20* (2013.01); *F16H 2025/127* (2013.01); *F16H 2025/204* (2013.01)

(58) Field of Classification Search
CPC ................ F16H 63/3026; F16H 25/20; F16H 2025/127; F16H 2025/204; F16H 61/32; F16H 63/46; F16H 63/18
See application file for complete search history.

(56) References Cited

U.S. PATENT DOCUMENTS

2016/0288795 A1* 10/2016 Ono ..................... B60W 30/19
2016/0290442 A1* 10/2016 Adachi .................. F16H 63/18
(Continued)

FOREIGN PATENT DOCUMENTS

JP          S63-57337 A    3/1988
JP          2001-140668 A  5/2001
(Continued)

OTHER PUBLICATIONS

Office Action issued in corresponding Japanese Patent Application No. 2019-101324 with the English translation thereof, dated Apr. 21, 2021.

*Primary Examiner* — David J Hlavka
(74) *Attorney, Agent, or Firm* — Carrier Blackman & Associates, P.C.; Joseph P. Carrier; William D. Blackman

(57) ABSTRACT

A power transmission apparatus includes a shift drum, a clutch, a clutch lifter, and a transmission body. The shift drum makes a dowel be extracted/inserted between a shifter and a shift gear. The clutch has first friction plates and second friction plates. The first friction plates rotate around a main shaft by receiving power from a crankshaft. The second friction plates are disposed alternately with the first friction plates and are relatively non-rotatably supported by the main shaft. The clutch lifter is displaced between a connection position at which power is transmitted by the clutch and a disconnection position at which the transmission of the power is disconnected. The transmission body transmits a driving force to the shift drum while the clutch lifter moves from the connection position to the disconnection position, in accordance with rotation of a shift spindle that rotates in accordance with a driving force.

15 Claims, 8 Drawing Sheets

(56) References Cited

U.S. PATENT DOCUMENTS

2016/0290500 A1* 10/2016 Ono .................... F16H 63/18
2019/0288879 A1* 9/2019 Komiya ............. H04L 25/0282

FOREIGN PATENT DOCUMENTS

| JP | 2009-275760 A | 11/2009 |
| JP | 2010-120569 A | 6/2010 |
| JP | 2014-035064 A | 2/2014 |
| JP | 2015-190593 A | 11/2015 |
| JP | 2016-191395 A | 11/2016 |

* cited by examiner

POWER TRANSMISSION APPARATUS

BACKGROUND

1. Technical Field

The present invention relates to a power transmission apparatus including a main shaft, a counter shaft, a shift drum, a clutch, a clutch lifter, and a shift spindle. The main shaft rotates on a first rotation axis. The counter shaft rotates on a second rotation axis parallel to the first rotation axis. The shift drum rotates to drive a shifter of at least one of the main shaft or the counter shaft and makes a dowel be extracted or inserted so that a shift gear will be relatively non-rotatably joined to the at least one of the main shaft or the counter shaft, thereby selectively establishing a speed stage between the main shaft and the counter shaft. The clutch has driving-side first friction plates and driven-side second friction plates. The first friction plates are supported rotatable around the main shaft and rotate by power transmitted from a crankshaft. The second friction plates are disposed alternately with the first friction plates and are relatively non-rotatably supported by the main shaft. The clutch lifter is displaced between a connection position and a disconnection position. The clutch lifter at the connection position makes the first friction plates and the second friction plates be mutually pressed so as to transmit power at the maximum. The clutch lifter at the disconnection position makes the first friction plates and the second friction plates be mutually separated so as to disconnect transmission of the power. The shift spindle rotates in accordance with a driving force supplied from an electric motor and thereby applies a driving force to the clutch lifter.

2. Description of the Background

Patent literature 1 discloses a shift spindle that rotates in accordance with a driving force supplied from a shift motor and thereby applies a driving force to a clutch lifter. The clutch lifter is displaced between a connection position and a disconnection position. The clutch lifter at the connection position makes alternately arranged driving-side first friction plates and driven-side second friction plates be mutually pressed so as to transmit power at the maximum. The clutch lifter at the disconnection position makes the first friction plates and the second friction plates be mutually separated so as to disconnect transmission of the power. The first friction plates are relatively non-rotatably supported by a clutch outer that rotates by power transmitted from a crankshaft. The second friction plates are relatively non-rotatably supported by a main shaft that is incorporated in a transmission. When the clutch lifter reaches the disconnection position in accordance with rotation of the shift spindle, a shifter arm is displaced in response to rotation of a shift drum, and a dowel is extracted between a shift gear and a shifter. As a result, gear shift operation is started.

CITATION LIST

Patent Literature

Patent literature 1: Japanese Unexamined Patent Application Laid-Open No. 2015-190593

BRIEF SUMMARY

When the clutch lifter starts to move from the connection position to the disconnection position, the first friction plates and the second friction plates come to slide on one another. The power that is transmitted from the crankshaft to the main shaft becomes reduced. Thus, the power, which is output from the counter shaft and is to be transmitted to a driving wheel, is partially lost or is reduced. The period of time of losing the power is desirably shortened to the least.

The present invention has been achieved in view of these circumstances, and an object of the present invention is to provide a power transmission apparatus in which loss of power output from a counter shaft is reduced to the least degree.

A first aspect of the present invention provides a power transmission apparatus including a main shaft, a counter shaft, a shift drum, a clutch, a clutch lifter, a shift spindle, and a transmission body. The main shaft is configured to rotate on a first rotation axis. The counter shaft is configured to rotate on a second rotation axis parallel to the first rotation axis. The shift drum is configured to rotate to drive a shifter of at least one of the main shaft or the counter shaft and to make a dowel be extracted or inserted so that a shift gear is relatively non-rotatably joined to the at least one of the main shaft or the counter shaft, thereby selectively establishing a speed stage between the main shaft and the counter shaft. The clutch includes driving-side first friction plates and driven-side second friction plates. The first friction plates are rotatably supported around the main shaft and are configured to rotate by power that is transmitted from a crankshaft. The second friction plates are disposed alternately with the first friction plates and are relatively non-rotatably supported by the main shaft. The clutch lifter is configured to be displaced between a connection position and a disconnection position. The clutch lifter at the connection position is configured to make the first friction plates and the second friction plates be mutually pressed so as to transmit power at the maximum. The clutch lifter at the disconnection position is configured to make the first friction plates and the second friction plates be mutually separated so as to disconnect transmission of the power. The shift spindle is configured to rotate in accordance with a driving force supplied from an electric motor and thereby apply a driving force to the clutch lifter. The transmission body is configured to transmit a driving force to the shift drum in accordance with rotation of the shift spindle while the clutch lifter moves from the connection position to the disconnection position.

In a second aspect, in addition to the configuration of the first aspect, the shift spindle may be configured to drive the clutch lifter to the disconnection position.

In a third aspect, in addition to the configuration of the first or the second aspect, ignition may be cut in an internal combustion engine that supplies power to the crankshaft, in rotating the shift drum.

In a fourth aspect, in addition to the configuration of the first or the second aspect, an injection amount of fuel may be reduced in the internal combustion engine that supplies power to the crankshaft, in rotating the shift drum.

In a fifth aspect, in addition to the configuration of the third or the fourth aspect, the power transmission apparatus may further include a throttle valve. The throttle valve may be provided to an intake path of the internal combustion engine and be coupled to an operation member to be used for throttle operation, by a wire.

In a sixth aspect, in addition to the configuration of any one of the first to the fifth aspects, the power transmission apparatus may further include a shift arm, a master arm, and a lost motion elastic body. The shift arm may be fixed to the shift spindle so as to swing around a rotation axis of the shift spindle and may be coupled directly to a clutch lifter lever that is coupled to the clutch lifter. The master arm may be supported in a manner swingable around the rotation axis of the shift spindle and may be configured to cause rotation of the shift drum. The lost motion elastic body may have an elasticity that provides a driving force for following swing of the shift arm, to the master arm.

In a seventh aspect, in addition to the configuration of the sixth aspect, the transmission body may be configured to come into contact with the master arm by receiving an elastic force of the lost motion elastic body, when the shift spindle rotates in a first direction around the rotation axis in shifting up. In addition, the shift arm may be configured to come into contact with the master arm after moving by a predetermined play angle, when the shift spindle rotates in a second direction opposite to the first direction, around the rotation axis in shifting down.

In the first aspect, although the clutch lifter does not yet reach the disconnection position, the first friction plates and the second friction plates start to slide on each other, whereby transmission of torque between the main shaft and the counter shaft is reduced accordingly. As a result, the dowel is extracted or inserted by the action of the driving force applied to the shift drum. Thus, a gear shift operation is completed in a half-clutch state. This requires only small rotation amount of the shift spindle and only a short time for the clutch to move between the connection position and the disconnection position, whereby loss of power from the counter shaft is reduced.

In the second aspect, when the extraction or insertion of the dowel is not completed in the half-clutch state, the shift spindle drives the clutch lifter to the disconnection position. As a result, the clutch is disconnected, and the dowel is extracted or inserted. Thus, the gear shift operation of the transmission is completed.

In the third aspect, although the clutch lifter does not yet reach the disconnection position, power that is supplied from the crankshaft is reduced, and transmitted torque is decreased. This facilitates extraction and insertion of the dowel.

In the fourth aspect, although the clutch lifter does not yet reach the disconnection position, power that is supplied from the crankshaft is reduced, and transmitted torque is decreased. This facilitates extraction and insertion of the dowel.

In the fifth aspect, the configuration is inexpensive but can reduce the time of the gear shift operation.

In the sixth aspect, rotation of the shift spindle makes the shift arm swing, and the clutch lifter lever starts to drive the clutch lifter accordingly. While the master arm receives the driving force from the lost motion elastic body, rotation of the shift drum is prevented, and the master arm is restrained from swinging, unless the driving force of the lost motion elastic body exceeds the joining force of the dowel. In this situation, the shift spindle continues to rotate further, and the clutch lifter also rotates further. This results in accumulation of an elastic force in the lost motion elastic body in accordance with rotation of the shift spindle. Then, transmission of torque between the first friction plates and the second friction plates is reduced as the clutch lifter is displaced. The elastic force that is accumulated in the lost motion elastic body comes to exceed the joining force of the dowel, whereby the shift drum starts to rotate. Thus, the gear shift operation is rapidly completed after the clutch comes to the half-clutch state.

In the seventh aspect, the shift drum rotates by the elastic force accumulated in the lost motion elastic body in shifting up. Thus, the gear shift operation is rapidly completed after the clutch comes to the half-clutch state. While the torque required to extract or insert the dowel increases in accordance with back torque in shifting down, it is difficult to reduce the back torque at a desired timing without operation of a passenger. In view of this, the shift drum is configured to rotate after the clutch lifter reaches the disconnection position. This reduces the burden on the components such as the dowel and the shifter in performing the gear shift operation.

DETAILED DESCRIPTION

An embodiment of the present invention will be described with reference to the attached drawings hereinafter. An up-down direction, a front-rear direction, and a right-left direction of a vehicle body are defined based on a line of sight of a passenger riding on a small vehicle.

Figure 1:
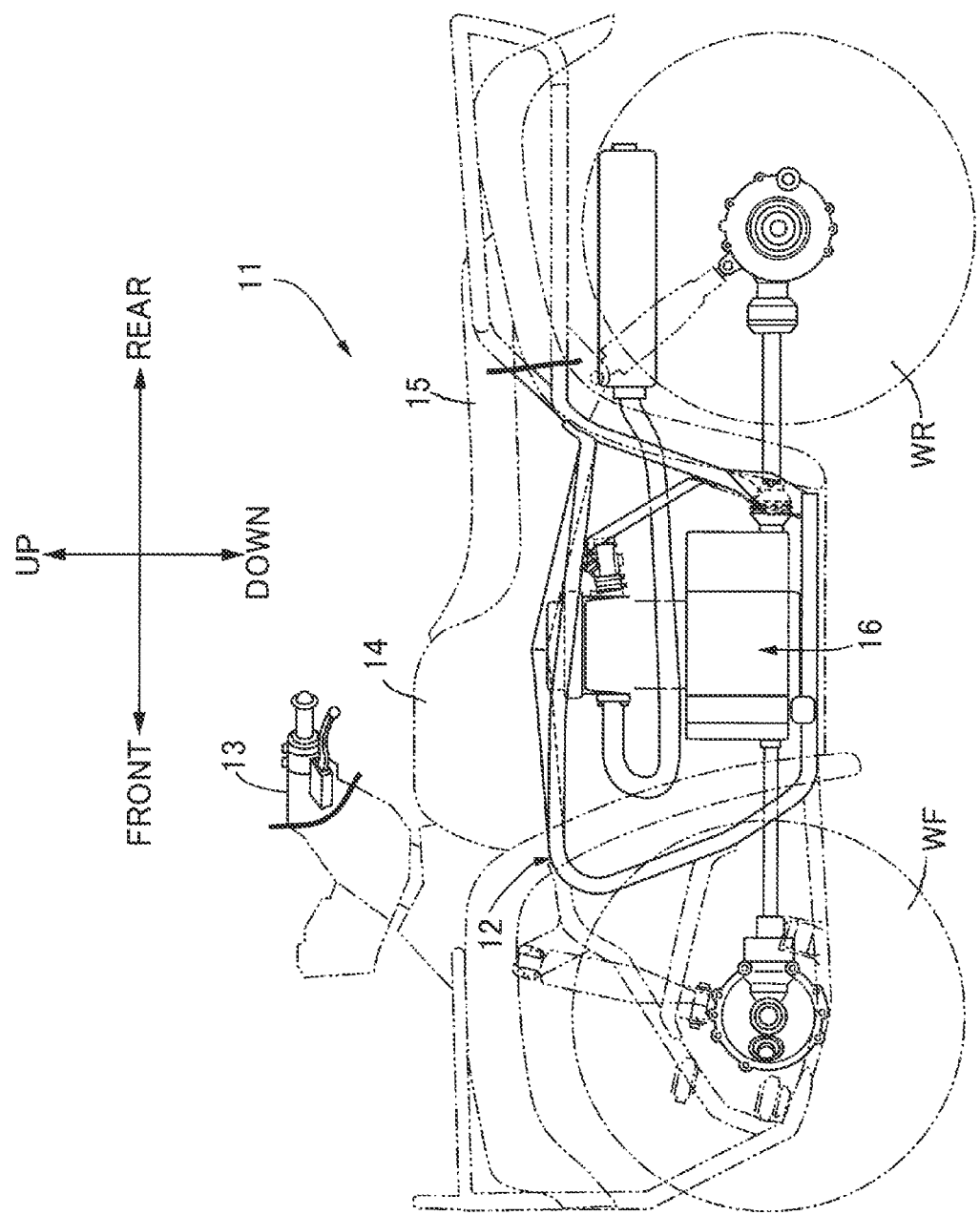
FIG. 1 is a side view schematically showing the whole saddled four-wheeled buggy as a small vehicle according to an embodiment of the present invention.

FIG. 1 schematically shows a configuration of a saddled four-wheeled buggy 11 as a small vehicle of an embodiment of the present invention. The four-wheeled buggy 11 includes a vehicle body frame 12 made of steel pipes that are assembled by welding to one another. The front part of the vehicle body frame 12 supports right and left front wheels WF in a manner rotatable around a horizontal axis. The rear part of the vehicle body frame 12 supports right and left rear wheels WR in a manner rotatable around a horizontal axis. The front wheels WF are coupled to a bar handle 13. The bar handle 13 is rotatably supported by the vehicle body frame 12 and turns the axle of the front wheels WE A fuel tank 14 for storing fuel is supported by the vehicle body frame 12 on a rear side of the bar handle 13. A passenger seat 15 to be ridden by a passenger is supported by the vehicle body frame 12 on a rear side of the fuel tank 14.

A power unit 16 is mounted on the vehicle body frame 12 between the front wheels WF and the rear wheels WR. The power unit 16 extends frontward to be coupled to the axle of the front wheels WF via a differential and also extends rearward to be coupled to the axle of the rear wheels WR via a differential. The front wheels WF and the rear wheels WR are driven based on power supplied from the power unit 16.

Figure 2:
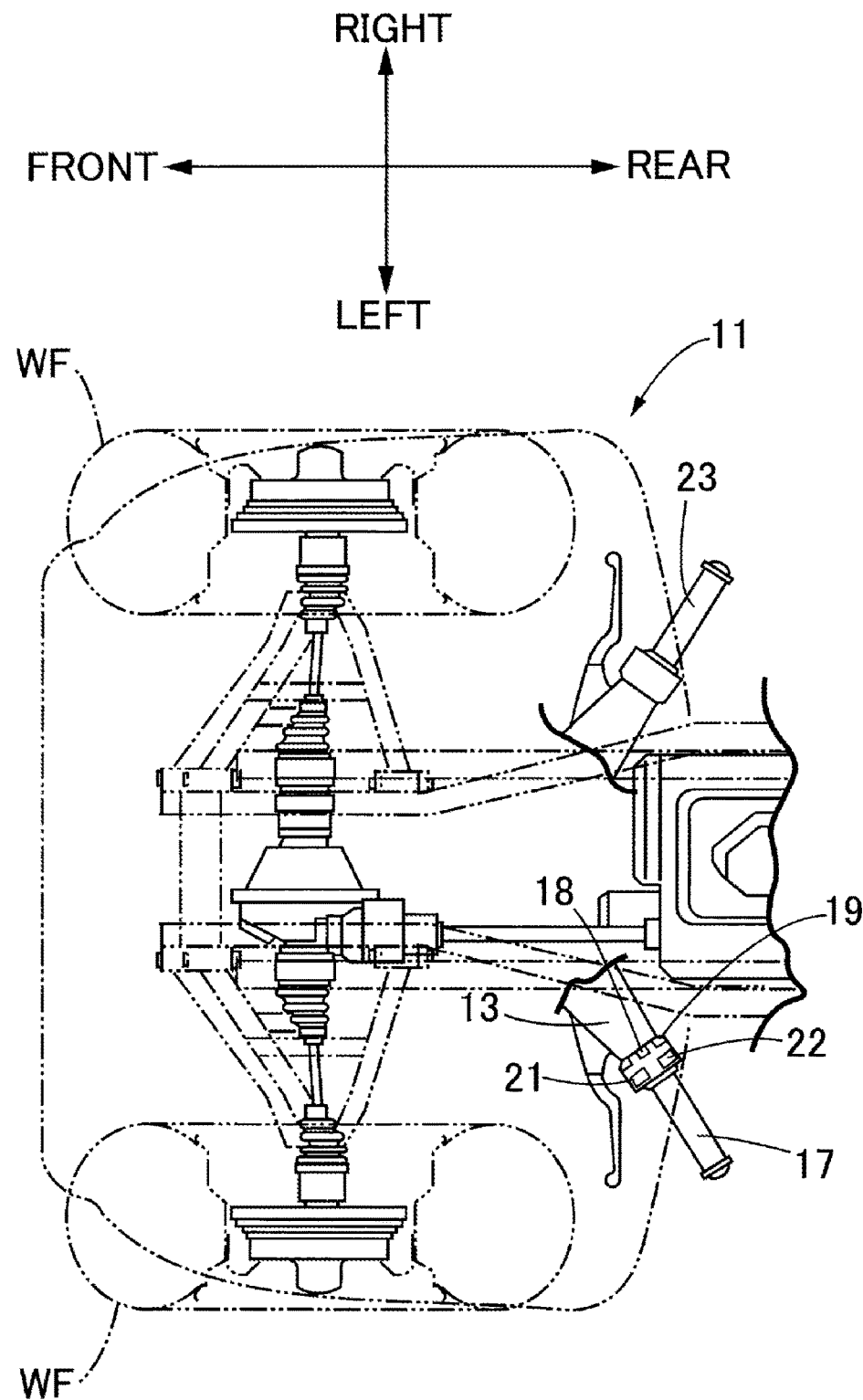
FIG. 2 is a partial plane view schematically showing a configuration of a front part of the four-wheeled buggy.

As shown in FIG. 2, a left grip 17 is fixed at a left end of the bar handle 13. In a range reachable by a finger of a hand that is gripping the left grip 17, a starter switch 18, a stop switch 19, a shift-up switch 21, and a shift-down switch 22 are arranged. The starter switch 18 activates the power unit 16. The stop switch 19 stops the power unit 16. The shift-up switch 21 causes shifting up in the transmission (described later) incorporated in the power unit 16. The shift-down switch 22 causes shifting down in the transmission.

A right grip 23 is attached to a right end of the bar handle 13 in a manner rotatable around an axial center. The right grip 23 functions as an operation member for operating a throttle. A passenger is allowed to adjust output of the power unit 16 by handling the right grip 23.

Figure 3:
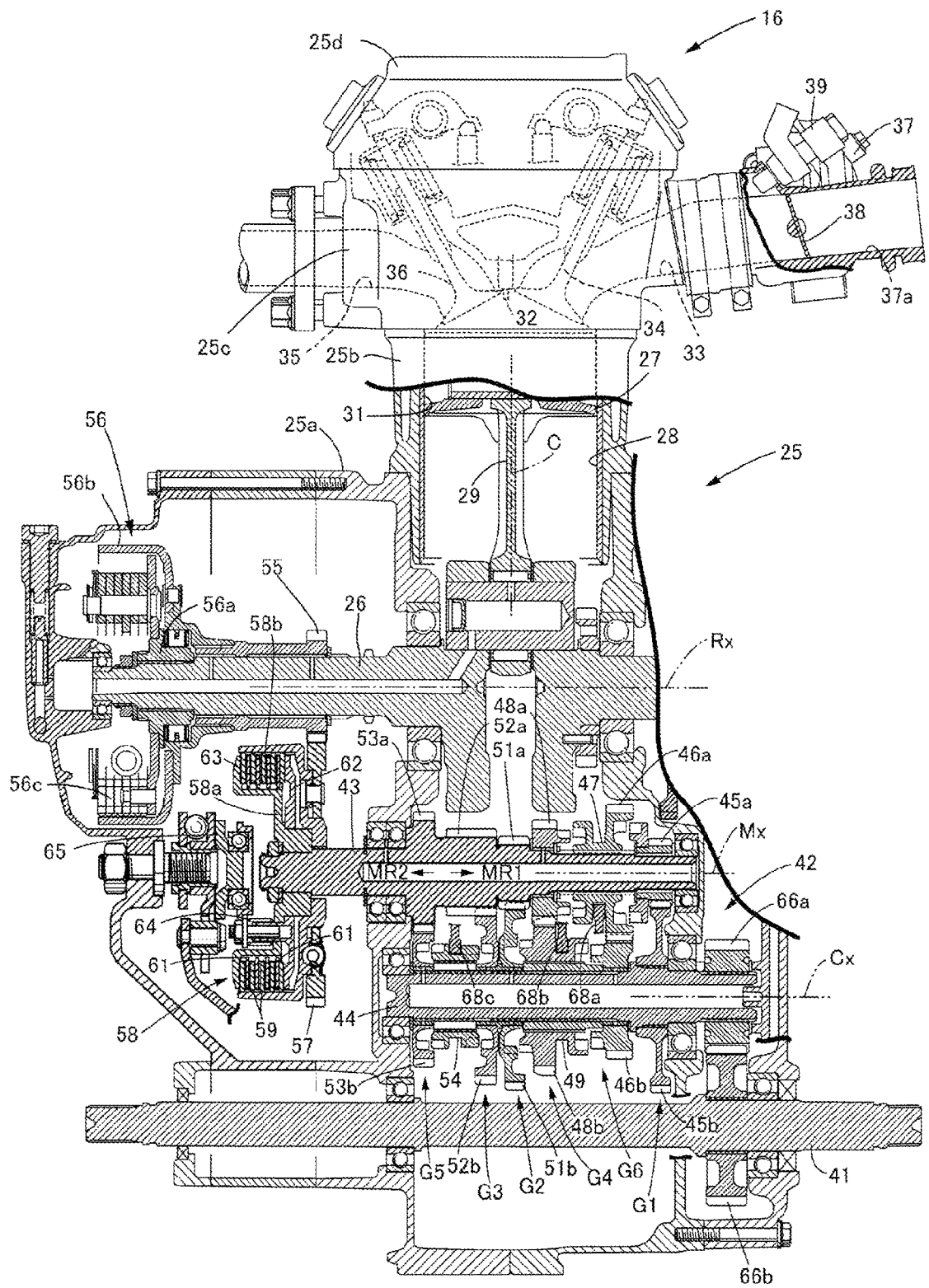
FIG. 3 is an enlarged sectional view of a power unit cut along a section containing a cylinder axis, a rotation axis of a crankshaft, a rotation axis of a main shaft, and a rotation axis of a counter shaft.

As shown in FIG. 3, the power unit 16 includes an internal combustion engine 25 that generates power in accordance with combustion of fuel supplied from the fuel tank 14. The internal combustion engine 25 includes a crank case 25a, a cylinder block 25b, a cylinder head 25c, and a head cover 25d. The crank case 25a supports a crankshaft 26 in a manner rotatable on a rotation axis Rx extending in the front-rear direction of the vehicle body. The cylinder block 25b is joined to the crank case 25a and defines a cylinder bore 28 that guides linear reciprocation of a piston 27 along a cylinder axis C. The cylinder head 25c is joined to the cylinder block 25b and closes the cylinder bore 28. The head cover 25d is joined to the cylinder head 25c and covers the cylinder head 25c. The piston 27 is coupled to a crank of the crankshaft 26 by a connecting rod 29. The linear reciprocation of the piston 27 is converted into rotation motion of the crankshaft 26. A combustion chamber 31 is defined between the cylinder head 25c and the piston 27. An ignition plug 32 is attached to the cylinder head 25c from a ceiling of the combustion chamber 31 and has a tip facing the combustion chamber 31.

The cylinder head 25c is formed with an intake passage 33 that opens to the combustion chamber 31. The intake passage 33 is opened and closed by the action of an intake valve 34. The intake valve 34 is axially displaceably supported by the cylinder head 25c. The cylinder head 25c is also formed with an exhaust passage 35 that opens to the combustion chamber 31. The exhaust passage 35 is opened and closed by the action of an exhaust valve 36. The exhaust valve 36 is axially displaceably supported by the cylinder head 25c.

A throttle body 37 is joined to the cylinder head 25c and defines a flow path 37a that is communicated with the intake passage 33. A butterfly throttle valve 38 is disposed to the throttle body 37 and opens and closes the flow path 37a. The throttle valve 38 is connected to the right grip 23 by a wire (not shown). Handling the right grip 23 causes axial displacement of the wire. The throttle valve 38 is opened in accordance with the axial displacement of the wire.

A fuel injection valve 39 for injecting fuel to air that flows through the flow path 37a is attached to the throttle body 37. The injected fuel generates air-fuel mixture. The fuel injection valve 39 is supplied with the fuel from the fuel tank 14. The injection amount of the fuel is set by an electronic control unit (ECU), for example.

In the internal combustion engine 25, the piston 27 repeatedly undergoes an intake stroke, a compression stroke, a combustion stroke, and an exhaust stroke, in this order, and thereby reciprocates linearly.

In the intake stroke, the piston 27 moves down in accordance with rotation of the crankshaft 26 based on an inertial force. This increases the capacity of the combustion chamber 31. The intake valve 34 is made to open, whereby the air-fuel mixture is introduced from the intake passage 33 into the combustion chamber 31.

In the compression stroke, the piston 27 moves up while the intake valve 34 and the exhaust valve 36 are closed. This decreases the capacity of the combustion chamber 31. Thus, the air-fuel mixture is compressed. In the combustion stroke, the air-fuel mixture is ignited by the ignition plug 32. Combustion of the air-fuel mixture lowers the piston 27. As a result, power is generated. In the exhaust stroke, the exhaust valve 36 opens, and the piston 27 moves up. This discharges exhaust gas from the combustion chamber 31 to the exhaust passage 35.

The power unit 16 includes a multistage transmission 42. The multistage transmission 42 is incorporated in the crank case 25a and transmits power from the crankshaft 26 to an output shaft 41. The multistage transmission 42 includes a main shaft 43 and a counter shaft 44. The main shaft 43 is supported by the crank case 25a in a manner rotatable on a rotation axis Mx that is parallel to the rotation axis Rx of the crankshaft 26. The counter shaft 44 is supported by the crank case 25a in a manner rotatable on a rotation axis Cx that is parallel to the rotation axis Mx of the main shaft 43. Selectively establishable gear trains of multiple speed stages are arranged between the main shaft 43 and the counter shaft 44. The gear trains include a first-speed gear train G1, a second-speed gear train G2, a third-speed gear train G3, a fourth-speed gear train G4, a fifth-speed gear train G5, and a sixth-speed gear train G6.

The first-speed gear train G1 includes a driving gear 45a and a driven gear 45b. The driving gear 45a is fitted to the main shaft 43 in a manner relatively rotatable on the same axis as the main shaft 43. The driven gear 45b is fixed to the counter shaft 44 in a manner relatively non-rotatable on the same axis as the counter shaft 44 and meshes with the driving gear 45a. The driving gear 45a is coupled to the main shaft 43 in a manner relatively non-displaceable in the axial direction of the main shaft 43.

The sixth-speed gear train G6 includes a driving gear 46a and a driven gear 46b. The driving gear 46a is joined to the main shaft 43 in a manner relatively non-rotatable on the same axis as the main shaft 43. The driven gear 46b is fitted to the counter shaft 44 in a manner relatively rotatable on the same axis as the counter shaft 44 and meshes with the driving gear 46a. The driving gear 46a is joined to a first shifter 47 that is joined to the main shaft 43 by a spline in a manner relatively displaceable in the axial direction. The driven gear 46b is coupled to the counter shaft 44 in a manner relatively non-displaceable in the axial direction of the counter shaft 44. Upon moving in a first axial direction MR1 from a neutral position, the first shifter 47 is coupled to the driving gear 45a of the first-speed gear train G1 by its dowel. This results in transmission of power from the main shaft 43 to the counter shaft 44 via the first-speed gear train G1. Thus, the first speed stage is established.

The fourth-speed gear train G4 includes a driving gear 48a and a driven gear 48b. The driving gear 48a is fitted to the main shaft 43 in a manner relatively rotatable on the same axis as the main shaft 43. The driven gear 48b is fitted to the counter shaft 44 in a manner relatively non-rotatable on the same axis as the counter shaft 44 and meshes with the driving gear 48a. The driving gear 48a is coupled to the main shaft 43 in a manner relatively non-displaceable in the axial direction of the main shaft 43. The driven gear 48b is joined to a second shifter 49 that is joined to the counter shaft 44 by a spline in a manner relatively displaceable in the axial direction. Upon moving in the first axial direction MR1 from a neutral position, the second shifter 49 is coupled to the driven gear 46*b* of the sixth-speed gear train G6 by its dowel. This results in transmission of power from the main shaft 43 to the counter shaft 44 via the sixth-speed gear train G6. Thus, the sixth speed stage is established.

On the other hand, while the second shifter 49 stops at the neutral position, and the driving gear 48*a* and the driven gear 48*b* of the fourth-speed gear train G4 mesh with each other, the first shifter 47 is coupled to the driving gear 48*a* of the fourth-speed gear train G4 by its dowel upon moving from the neutral position in a second axial direction MR2 opposite to the first axial direction MR1. This results in transmission of power from the main shaft 43 to the counter shaft 44 via the fourth-speed gear train G4. Thus, the fourth speed stage is established.

The second-speed gear train G2 includes a driving gear 51*a* and a driven gear 51*b*. The driving gear 51*a* is coaxially fixed to the main shaft 43. The driven gear 51*b* is fitted to the counter shaft 44 in a manner relatively rotatable on the same axis as the counter shaft 44 and meshes with the driving gear 51*a*. The driving gear 51*a* is integrally formed with the main shaft 43. The driven gear 51*b* is coupled to the counter shaft 44 in a manner relatively non-displaceable in the axial direction of the counter shaft 44. Upon moving in the second axial direction MR2 from the neutral position, the second shifter 49 is coupled to the driven gear 51*b* of the second-speed gear train G2 by its dowel. This results in transmission of power from the main shaft 43 to the counter shaft 44 via the second-speed gear train G2. Thus, the second speed stage is established.

The third-speed gear train G3 includes a driving gear 52*a* and a driven gear 52*b*. The driving gear 52*a* is joined to the main shaft 43 in a manner relatively non-rotatable on the same axis as the main shaft 43. The driven gear 52*b* is fitted to the counter shaft 44 in a manner relatively rotatable on the same axis as the counter shaft 44 and meshes with the driving gear 52*a*. The driving gear 52*a* is supported by the main shaft 43 in a manner non-displaceable in the axial direction of the main shaft 43. The driven gear 52*b* is coupled to the counter shaft 44 in a manner relatively non-displaceable in the axial direction of the counter shaft 44. Similarly, the fifth-speed gear train G5 includes a driving gear 53*a* and a driven gear 53*b*. The driving gear 53*a* is joined to the main shaft 43 in a manner relatively non-rotatable on the same axis as the main shaft 43. The driven gear 53*b* is fitted to the counter shaft 44 in a manner relatively rotatable on the same axis as the counter shaft 44 and meshes with the driving gear 53*a*. The driving gear 53*a* is supported by the main shaft 43 in a manner non-displaceable in the axial direction of the main shaft 43. The driven gear 53*b* is coupled to the counter shaft 44 in a manner relatively non-displaceable in the axial direction of the counter shaft 44.

The counter shaft 44 supports a third shifter 54 that is joined thereto by a spline in a manner relatively displaceable in the axial direction of the counter shaft 44. Upon moving in the first axial direction MR1 from a neutral position, the third shifter 54 is coupled to the driven gear 52*b* of the third-speed gear train G3 by its dowel. This results in transmission of power from the main shaft 43 to the counter shaft 44 via the third-speed gear train G3. Thus, the third speed stage is established. On the other hand, upon moving in the second axial direction MR2 from the neutral position, the third shifter 54 is coupled to the driven gear 53*b* of the fifth-speed gear train G5 by its dowel. This results in transmission of power from the main shaft 43 to the counter shaft 44 via the fifth-speed gear train G5. Thus, the fifth speed stage is established.

A driving gear 55 is fitted to the crankshaft 26 in a manner relatively rotatable around the rotation axis Rx of the crankshaft 26. A start clutch 56 is arranged between the crankshaft 26 and the driving gear 55. The start clutch 56 includes a clutch inner 56*a*, a clutch outer 56*b*, and a clutch shoe 56*c*. The clutch inner 56*a* is relatively non-rotatably fixed to the crankshaft 26. The clutch outer 56*b* is relatively non-rotatably coupled to the driving gear 55 so as to surround the clutch inner 56*a* around the crankshaft 26. The clutch shoe 56*c* is supported by the clutch inner 56*a* in a manner swingable on a swing axis parallel to the rotation axis Rx of the crankshaft 26. As the number of rotation of the crankshaft 26 increases, the clutch shoe 56*c* swings in a direction away from the rotation axis Rx by the action of a centrifugal force acting on a flyweight and comes into frictional contact with the clutch outer 56*b*. The driving gear 55 is automatically joined to the crankshaft 26 in accordance with increase in the number of rotation.

A driven gear 57 is fitted to the main shaft 43 in a manner relatively rotatable around the rotation axis Mx of the main shaft 43. The driven gear 57 meshes with the driving gear 55 on the crankshaft 26. A gear shift clutch 58 is arranged between the main shaft 43 and the driven gear 57. The gear shift clutch 58 includes a clutch inner 58*a* and a clutch outer 58*b*. The clutch inner 58*a* is relatively non-rotatably fixed to the main shaft 43. The clutch outer 58*b* is coupled to the driven gear 57 around the rotation axis Mx so as to surround the clutch inner 58*a* around the main shaft 43. The clutch outer 58*b* supports multiple first friction plates 59 in a manner relatively non-rotatable around the main shaft 43 and axially displaceable. The first friction plates 59 are supported rotatably around the main shaft 43 and rotate by power that is transmitted from the crankshaft 26. The clutch inner 58*a* supports multiple second friction plates 61 in a manner relatively non-rotatable around the main shaft 43 and axially displaceable. The first friction plates 59 and the second friction plates 61 are alternately disposed in the axial direction of the main shaft 43.

The clutch inner 58*a* axially displaceably supports a driving plate 62. The first friction plates 59 and the second friction plates 61 are arranged in the axial direction between the driving plate 62 and a pressure receiving plate 63 of the clutch inner 58*a*. The driving plate 62 is driven in a direction toward the pressure receiving plate 63 by the action of a coil spring 64. As a result, the first friction plates 59 and the second friction plates 61 are alternately put on each other, whereby the clutch outer 58*b* is joined to the clutch inner 58*a*.

A clutch lifter 65 is coupled to the driving plate 62 in a manner relatively rotatable around the rotation axis Mx of the main shaft 43. The clutch lifter 65 is displaced between a connection position and a disconnection position. The clutch lifter 65 at the connection position makes the first friction plates 59 and the second friction plates 61 be mutually pressed so as to transmit power at the maximum. The clutch lifter 65 at the disconnection position makes the first friction plates 59 and the second friction plates 61 be mutually separated so as to disconnect transmission of the power.

An output gear 66*a* is joined to the counter shaft 44 in a manner relatively non-rotatable on the same axis as the counter shaft 44. The output gear 66*a* meshes with a driven gear 66*b* that is coaxially fixed to the output shaft 41. Thus, power of the crankshaft 26 is transmitted from the counter shaft 44 to the output shaft 41.

Figure 4:
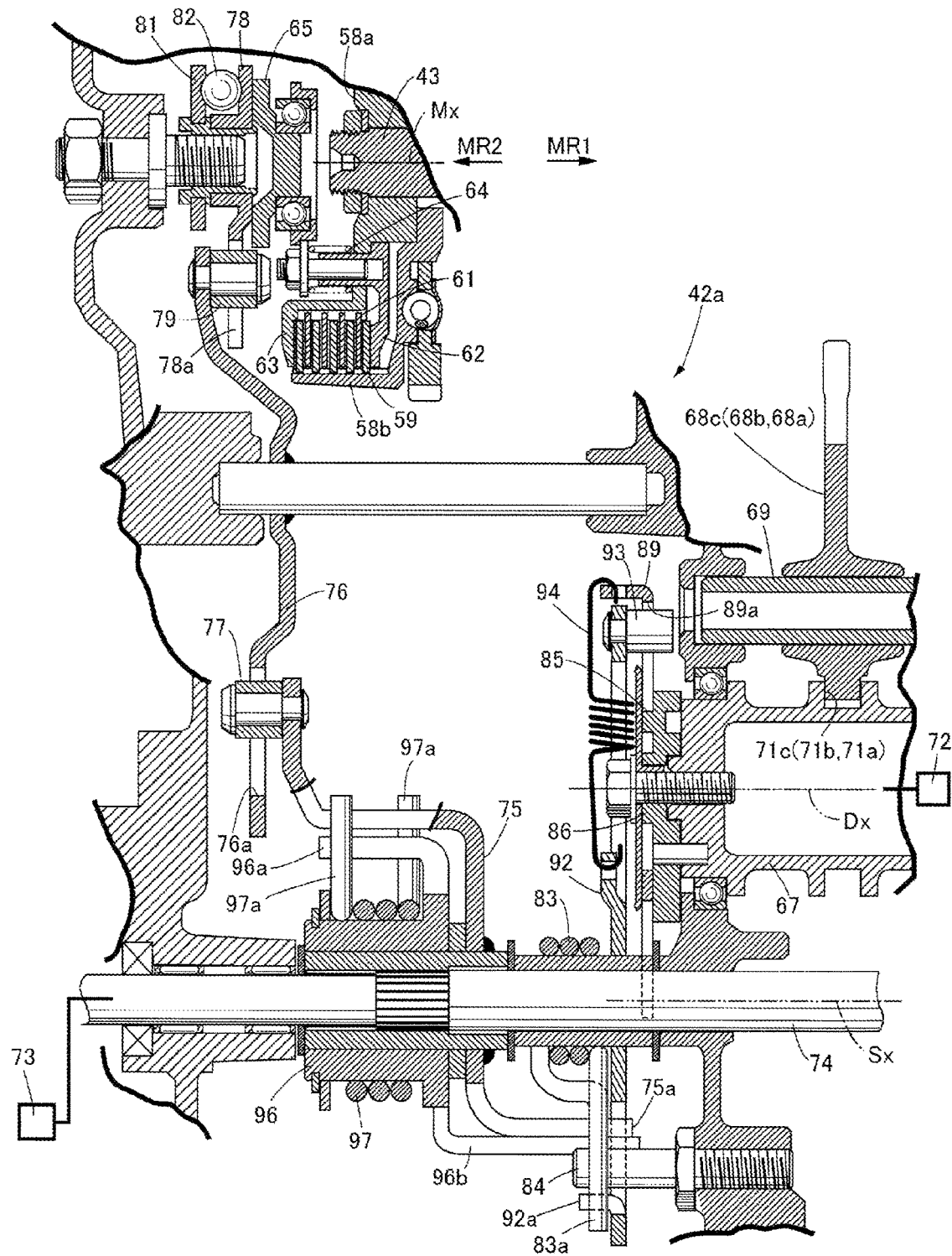
FIG. 4 is an enlarged configuration view of a gear shift control system.

As shown in FIG. 4, the multistage transmission 42 includes a gear shift control system 42*a* for sequentially switching the speed stages among the neutral stage, the first speed stage, the second speed stage, the third speed stage, the fourth speed stage, the fifth speed stage, and the sixth speed stage, in this order. The gear shift control system 42a includes a shift drum 67 and a guide shaft 69. The shift drum 67 rotates on a rotation axis Dx parallel to the rotation axis Mx of the main shaft 43 and the rotation axis Cx of the counter shaft 44. The guide shaft 69 guides displacement of a first shift fork 68a, a second shift fork 68b, and a third shift fork 68c in parallel to the rotation axis Dx of the shift drum 67. The shift drum 67 includes a first cam groove 71a, a second cam groove 71b, and a third cam groove 71c that are formed on an outer circumferential surface. The first cam groove 71a engages with the first shift fork 68a and displaces the first shift fork 68a along the guide shaft 69 in accordance with rotation of the shift drum 67. The second cam groove 71b engages with the second shift fork 68b and displaces the second shift fork 68b along the guide shaft 69 in accordance with rotation of the shift drum 67. The third cam groove 71c engages with the third shift fork 68c and displaces the third shift fork 68c along the guide shaft 69 in accordance with rotation of the shift drum 67. The first cam groove 71a and the second cam groove 71b have structures similar to the structure of the third cam groove 71c. For this reason, the first shift fork 68a and the second shift fork 68b are omitted in FIG. 4.

As shown in FIG. 3, the first shift fork 68a is coupled to the first shifter 47 in a manner relatively rotatable around the main shaft 43. Displacement of the first shift fork 68a in accordance with rotation of the shift drum 67 causes displacement in the axial direction of the first shifter 47 on the main shaft 43. The second shift fork 68b is coupled to the second shifter 49 in a manner relatively rotatable around the counter shaft 44. Displacement of the second shift fork 68b in accordance with rotation of the shift drum 67 causes displacement in the axial direction of the second shifter 49 on the counter shaft 44. The third shift fork 68c is coupled to the third shifter 54 in a manner relatively rotatable around the counter shaft 44. Displacement of the third shift fork 68c in accordance with rotation of the shift drum 67 causes displacement in the axial direction of the third shifter 54 on the counter shaft 44. The shift drum 67 rotates to drive the first shifter 47 of the main shaft 43 and to drive the second shifter 49 and the third shifter 54 of the counter shaft 44. This makes the driving gear and the driven gear be relatively non-rotatably joined to each other between the main shaft 43 and the counter shaft 44 in accordance with extraction or insertion of the dowel. Thus, the shift drum 67 selectively establishes the speed stage between the main shaft 43 and the counter shaft 44.

As shown in FIG. 4, the shift drum 67 is connected to a potentiometer 72. The potentiometer 72 measures a rotation angle around the rotation axis Dx of the shift drum 67. The speed stage (e.g. the neutral stage, the first speed stage, and the second speed stage) of the multistage transmission 42 is determined in accordance with the rotation angle. The determination of the speed stage can be performed by other means.

Figure 5:
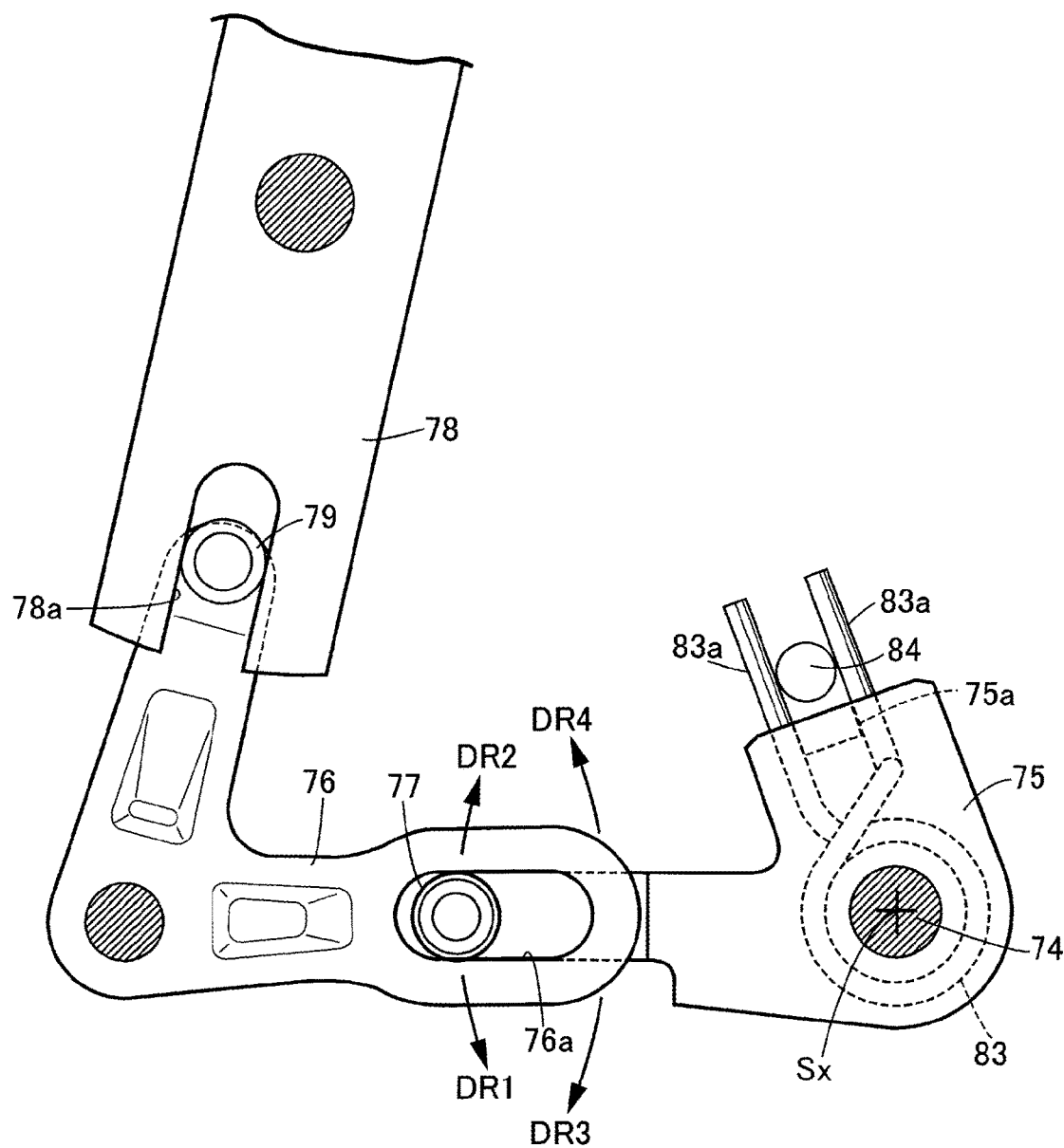
FIG. 5 is an enlarged plane view of a shift arm and a clutch shifter lever as viewed from an axial direction of a shift spindle.

As shown in FIGS. 4 and 5, the gear shift control system 42a includes a shift spindle 74. The shift spindle 74 rotates on a shaft center (rotation axis) Sx in accordance with a driving force that is supplied from the electric motor 73 and thereby applies a driving force to the clutch lifter 65. The electric motor 73 generates a driving force around a driving shaft in accordance with supply of electric power. The driving force of the electric motor 73 is transmitted to the shift spindle 74 via a reduction gear mechanism. The shaft center Sx of the shift spindle 74 is arranged in parallel to the rotation axis Mx of the main shaft 43 and the rotation axis Dx of the shift drum 67.

A shift arm 75 is fixed to the shift spindle 74 in a manner relatively non-rotatable around the shaft center Sx. A clutch lifter lever 76 is coupled to the shift arm 75, and the clutch lifter lever 76 is supported so as to be swingable on an axis parallel to the shaft center Sx of the shift spindle 74. To couple the clutch lifter lever 76 to the shift arm 75, a pin roller 77 having an axial center parallel to the shaft center Sx is supported by the shift arm 75. The pin roller 77 is inserted in a long hole 76a that linearly extends in a centrifugal direction in the clutch lifter lever 76 and moves in the long hole 76a. When the electric motor 73 drives to rotate the shift spindle 74 on the shaft center Sx in response to a shift-up signal, the shift arm 75 swings from a neutral position in a first circumferential direction DR1 around the shaft center Sx of the shift spindle 74. The swing of the shift arm 75 immediately causes the clutch lifter lever 76 to swing from a neutral position in a third circumferential direction DR3. When the electric motor 73 drives to rotate the shift spindle 74 on the shaft center Sx in response to a shift-down signal, the shift arm 75 swings from the neutral position in a second circumferential direction DR2 opposite to the first circumferential direction DR1 around the shaft center Sx of the shift spindle 74. The swing of the shift arm 75 immediately causes the clutch lifter lever 76 to swing from the neutral position in a fourth circumferential direction DR4 opposite to the third circumferential direction DR3.

A lifter driving member 78 is coupled to the clutch lifter lever 76. The lifter driving member 78 is supported in a manner rotatable on the same axis as the rotation axis Mx of the main shaft 43. To couple the lifter driving member 78 to the clutch lifter lever 76, a pin roller 79 having an axial center parallel to the shaft center Sx is supported by the clutch lifter lever 76, at a position away from a rotation axis of the clutch lifter lever 76. The pin roller 79 is inserted in a guide path 78a that linearly extends in a centrifugal direction in the lifter driving member 78 and moves in the guide path 78a.

The lifter driving member 78 and a cam plate 81 have a ball 82 therebetween in the axial direction of the rotation axis Mx. The cam plate 81 makes the ball 82 move in the axial direction of the rotation axis Mx in accordance with the position in the circumferential direction around the rotation axis Mx. When the clutch lifter lever 76 swings in the third circumferential direction DR3 from the neutral position, and the ball 82 is displaced around the rotation axis Mx in accordance with rotation of the lifter driving member 78, the lifter driving member 78 drives the clutch lifter 65 from the connection position to the disconnection position. Similarly, when the clutch lifter lever 76 swings in the fourth circumferential direction DR4 from the neutral position, and the ball 82 is displaced around the rotation axis Mx in accordance with rotation of the lifter driving member 78, the lifter driving member 78 drives the clutch lifter 65 from the connection position to the disconnection position.

A torsion spring 83 is fitted to the shift spindle 74 so as to be wound around the shaft center Sx. The torsion spring 83 includes a linear body 83a that is integrally formed at each end. The linear bodies 83a extend parallel to each other in a direction away from the shaft center Sx. The torsion spring 83 is applied with an elastic force for making the linear bodies 83a come close to each other around the shaft center Sx. The linear bodies 83a have a shaft body 84 therebetween. The shaft body 84 has a shaft center parallel to the shaft center Sx and is fixed to the crank case 25a. The shift arm 75 is integrally formed with an engaging piece 75a that is disposed between the linear bodies 83a. Swing of the shift arm 75 makes the engaging piece 75a drive one of the linear bodies 83a in a direction away from the shaft body 84. This accumulates an elastic force in the torsion spring 83. Upon being released from a binding force, the shift arm 75 returns to the neutral position by the action of the torsion spring 83.

Figure 6:
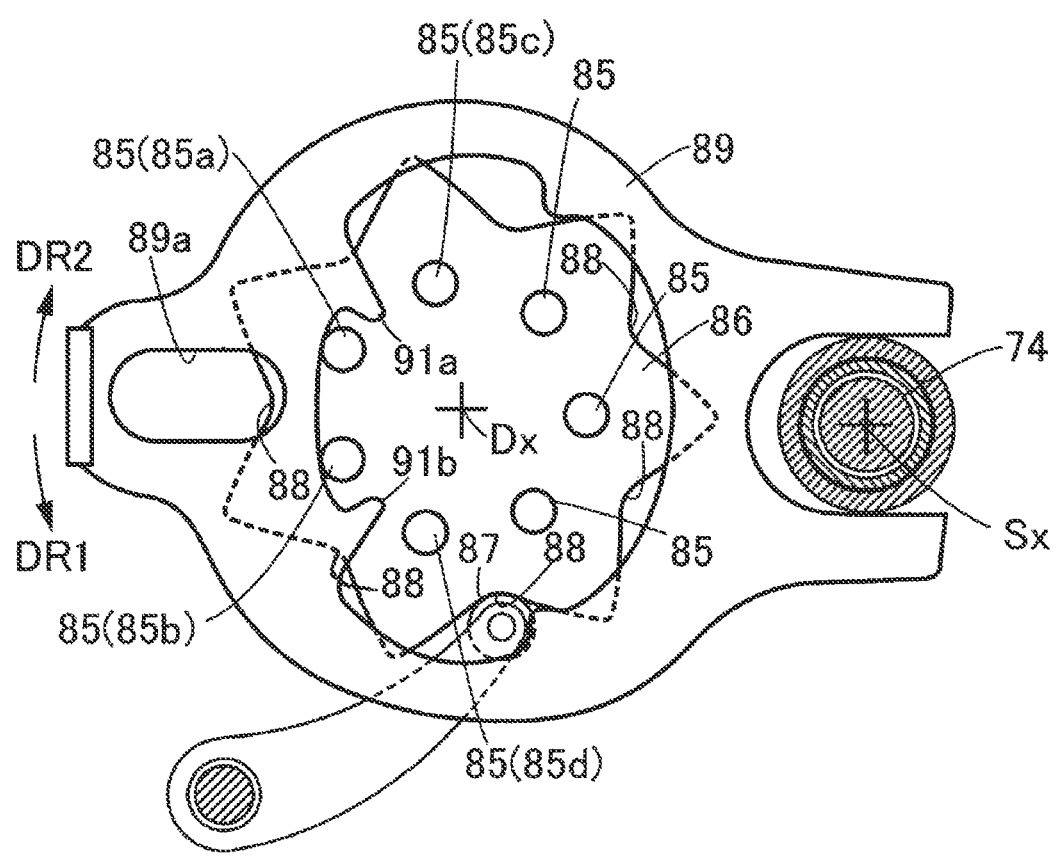
FIG. 6 is an enlarged plane view of a pin holding plate and an engaging plate as viewed from an axial direction of a shift drum.

A pin holding plate 86, as shown in FIG. 6, is fixed to the shift drum 67 and supports multiple pins 85 having axial centers parallel to the rotation axis Dx. The pins 85 are arranged on the pin holding plate 86, on the same circle at an even interval in the circumferential direction around the rotation axis Dx. The pin holding plate 86 includes recesses 88 that are formed at an outer edge, and the recesses 88 are configured to engage with a driving roller 87. The driving roller 87 engages with the recess 88 along a cylindrical plane coaxial with an axis parallel to the rotation axis Dx. The driving roller 87 is applied with a pressing force to the outer edge of the pin holding plate 86 by the action of an elastic body. The recess 88 receives the pressing force from the driving roller 87 and stepwisely positions the shift drum 67 at a predetermined angle position around the rotation axis Dx.

An engaging plate 89 is put on the pin holding plate 86. The engaging plate 89 is supported by the shift spindle 74 in a manner displaceable in a centrifugal direction and relatively rotatable around the shaft center Sx of the shift spindle 74. The engaging plate 89 is formed with a first hook 91a and a second hook 91b. The first hook 91a applies a rotation force around the rotation axis Dx to the pin holding plate 86 by engaging with the pin 85 when the engaging plate 89 swings in the first circumferential direction DR1 around the shaft center Sx. The second hook 91b applies a rotation force around the rotation axis Dx to the pin holding plate 86 by engaging with the pin 85 when the engaging plate 89 swings in the second circumferential direction DR2 around the shaft center Sx.

Figure 7A:
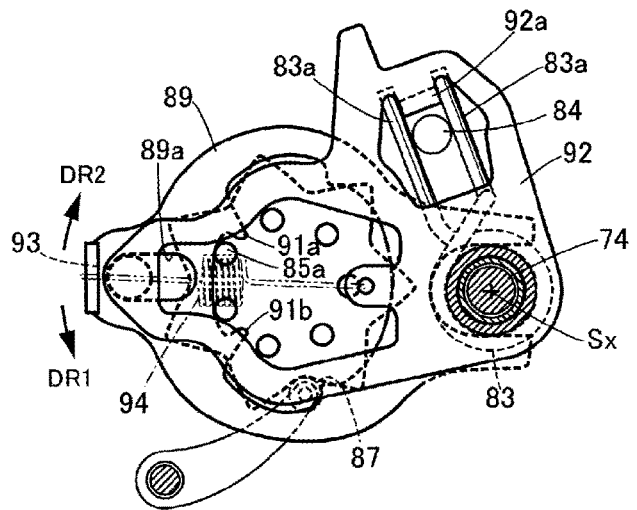
FIGS. 7A to 7E are enlarged plane views of a master arm and the engaging plate as viewed from the axial direction of the shift drum.

As shown in FIG. 7A, a master arm 92 is relatively rotatably supported around the shaft center Sx of the shift spindle 74. The master arm 92 is coupled to the engaging plate 89 in a manner relatively non-rotatable around the shaft center Sx of the shift spindle 74. To couple the master arm 92 to the engaging plate 89, a coupling shaft 93 having a shaft center parallel to the shaft center Sx is supported by the master arm 92, at a position away from the shaft center Sx of the shift spindle 74. The coupling shaft 93 is inserted in a long hole 89a that linearly extends in a centrifugal direction in the engaging plate 89. Swing of the master arm 92 causes the engaging plate 89 swing around the shaft center Sx of the shift spindle 74. The rotation force of the shift spindle 74 is transmitted to the master arm 92.

A coil spring 94 that exerts a tensile force in a linear direction is coupled between the master arm 92 and the engaging plate 89. The coil spring 94 exerts an elastic force that pulls the engaging plate 89 toward the shaft center Sx of the shift spindle 74.

The master arm 92 is integrally formed with an engaging piece 92a that is disposed between the linear bodies 83a of the torsion spring 83. Swing of the master arm 92 makes the engaging piece 92a drive one of the linear bodies 83a in a direction away from the shaft body 84. This accumulates an elastic force in the torsion spring 83. Upon being released from a binding force, the master arm 92 returns to the neutral position by the action of the torsion spring 83.

Figure 7B:
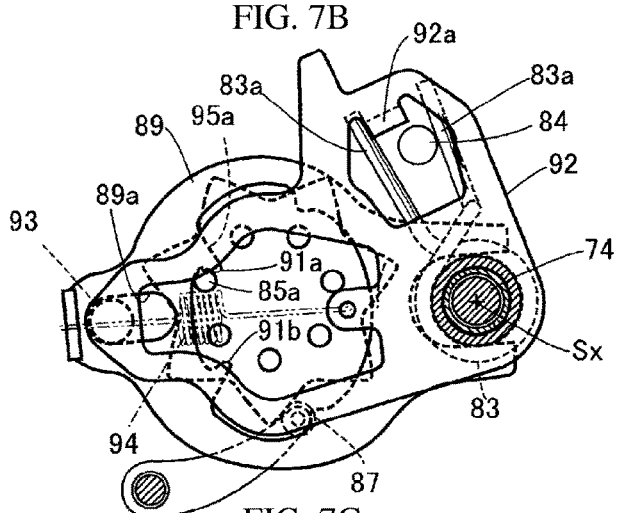

As shown in FIG. 7B, when the master arm 92 swings in the first circumferential direction DR1 in shifting up, the pin holding plate 89 rotates around the rotation axis Dx by engagement of the first hook 91a with the pin 85a. The swing of the master arm 92 thus causes rotation of the shift drum 67. The shift forks 68a, 68b, and 68c are then driven. The dowel is extracted or inserted between the first shifter 47, the second shifter 49, or the third shifter 54 and the shift gear.

Figure 7D:
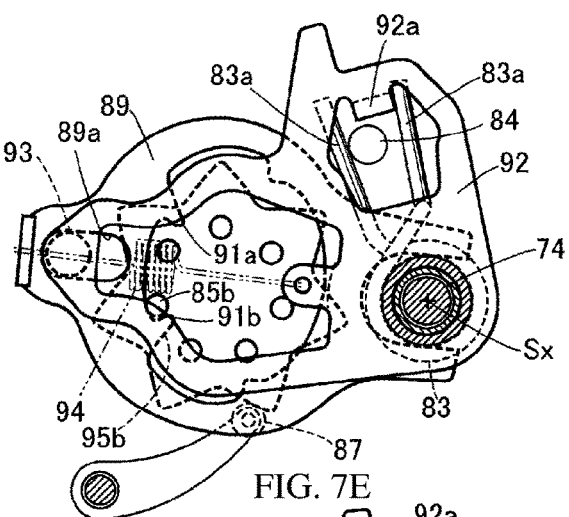
Figure 7C:
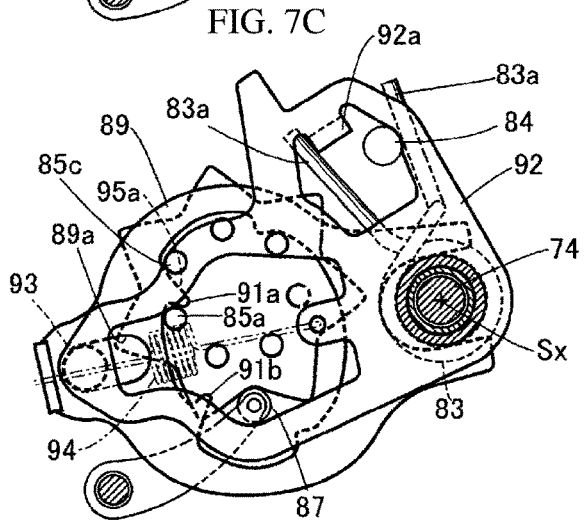

The shift up is completed when the driving roller 87 goes over the top between the recesses 88 and is contained in the adjacent recess 88, as shown in FIG. 7C. Thereafter, when the master arm 92 returns to the neutral position, the first hook 91a goes over the pin 85c by the action of a cam edge 95a continuous with the first hook 91a. The engaging plate 89 swings to the neutral position while being separated from the shaft center Sx of the shift spindle 74.

As shown in FIG. 7D, when the master arm 92 swings in the second circumferential direction DR2 in shifting down, the pin holding plate 89 rotates around the rotation axis Dx by engagement of the second hook 91b with the pin 85b. The swing of the master arm 92 thus causes rotation of the shift drum 67. The shift forks 68a, 68b, and 68c are then driven. The dowel is extracted or inserted between the first shifter 47, the second shifter 49, or the third shifter 54 and the shift gear.

Figure 7E:
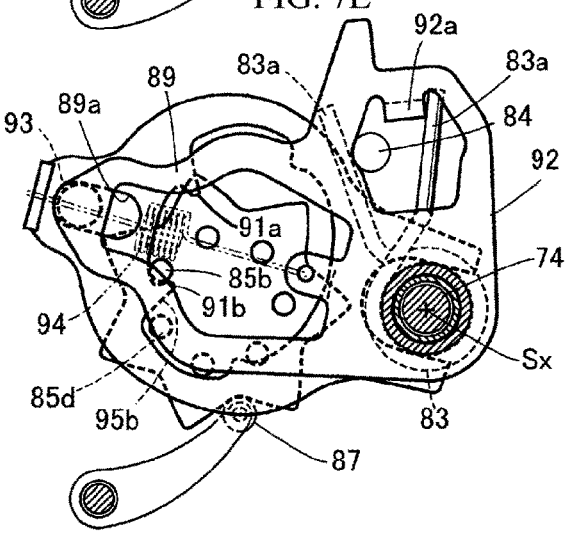

The shift down is completed when the driving roller 87 goes over the top between the recesses 88 and is contained in the adjacent recess 88, as shown in FIG. 7E. Thereafter, when the master arm 92 returns to the neutral position, the second hook 91b goes over the pin 85d by the action of a cam edge 95b continuous with the second hook 91b. The engaging plate 89 swings to the neutral position while being separated from the shaft center Sx of the shift spindle 74.

As shown in FIGS. 8A to 8F, the shift spindle 74 supports a support arm (transmission body) 96 in a manner swingable around the shaft center Sx. The support arm 96 supports a torsion spring (lost motion elastic body) 97 that is wound around the shaft center Sx of the shift spindle 74. The torsion spring 97 includes a linear body 97a that is integrally formed at each end. The linear bodies 97a extend parallel to each other in a direction away from the shaft center Sx. The torsion spring 97 is applied with an elastic force for making the linear bodies 97a come close to each other around the shaft center Sx. An arm body 75b and an engaging piece 96a are disposed between the linear bodies 97a. The arm body 75b is formed to the shift arm 75 and supports the pin roller 77 at an end. The engaging piece 96a is integrally formed with the support arm 96. The linear bodies 97a couple the shift arm 75 and the support arm 96 with each other around the shaft center Sx of the shift spindle 74. In the state in which the support arm 96 is not restrained around the shaft center Sx of the shift spindle 74, the support arm 96 swings in accordance with swing of the shift arm 75.

The support arm 96 is integrally formed with a driving piece 96b. The driving piece 96b comes into contact with the master arm 92 upon receiving an elastic force of the torsion spring 97 when the shift arm 75 swings in the first circumferential direction DR1 around the shaft center Sx of the shift spindle 74. When the shift arm 75 swings in the first circumferential direction DR1 around the shaft center Sx of the shift spindle 74 in shifting up, the torsion spring 97 applies a driving force for following the swing of the shift arm 75, to the master arm 92.

Figure 8A:
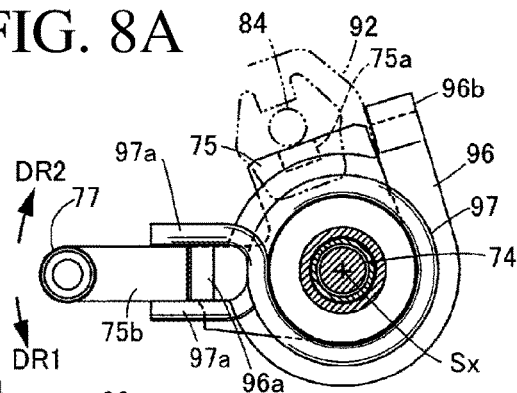
FIGS. 8A to 8F are enlarged plane views of the shift arm and a support arm as viewed from the axial direction of the shift spindle.
Figure 8B:
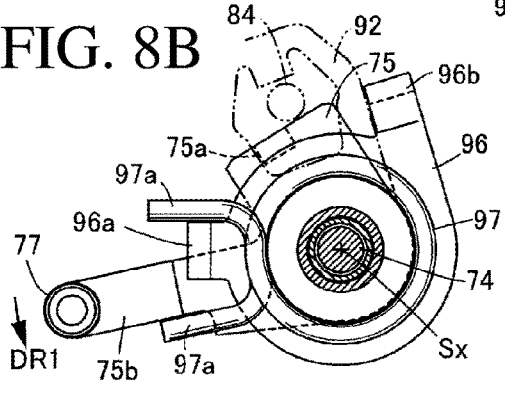

As shown in FIG. 8B, the shift arm 75 rotates in the first circumferential direction DR1 around the shaft center Sx of the shift spindle 74 in shifting up. Meanwhile, the clutch lifter lever 76 starts to swing in the third circumferential direction DR3. The first friction plates 59 and the second friction plates 61 do not smoothly slide on each other at the time the clutch lifter 65 starts to move. Thus, a large torque acts on the driving gear of the main shaft 43 or the driven gear of the counter shaft 44 in the gear train for the speed stage, whereby the axial displacement of the dowel is restrained. As a result, the angle position of the shift drum 67 is not changed. This prevents the master arm 92 from swinging around the shaft center Sx of the shift spindle 74.

At this time, the driving piece 96b of the support arm 96 receives the elastic force of the torsion spring 97 and comes into contact with the master arm 92, thereby preventing the support arm 96 from following the swing of the shift arm 75. The arm body 75b of the shift arm 75 drives the linear body 97a of the torsion spring 97 in a direction away from the engaging piece 96a of the support arm 96. This accumulates an elastic force in the torsion spring 97.

Figure 8E:
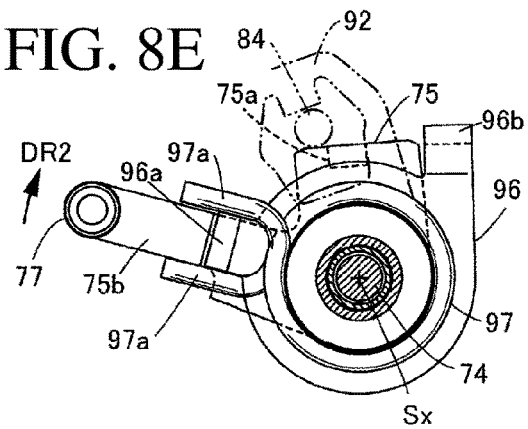
Figure 8C:
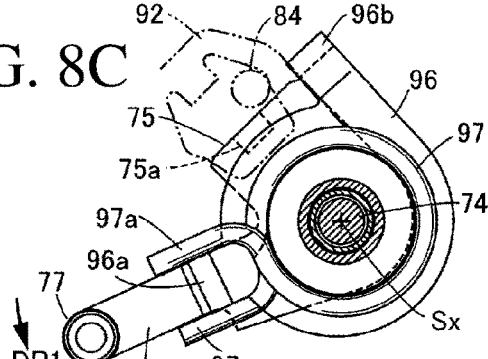

When the shift arm 75 further rotates in the first circumferential direction DR1 around the shaft center Sx of the shift spindle 74, as shown in FIG. 8C, the clutch lifter lever 76 further swings in the third circumferential direction DR3. During movement of the clutch lifter 65 from the connection position to the disconnection position, the first friction plates 59 and the second friction plates 61 start to slide on each other, whereby transmission of torque between the main shaft 43 and the counter shaft 44 is reduced accordingly. At this time, the elastic force that is accumulated in the torsion spring 97 makes the support arm 96 provide a driving force around the shaft center Sx of the shift spindle 74, to the master arm 92. Then, the master arm 92 swings, and a rotation force is thereby applied to the shift drum 67. As a result, the dowel is extracted or inserted in the gear train for the speed stage. Thus, a gear shift operation is completed in a half-clutch state. This requires only small rotation amount of the shift spindle 74 and only a short time for the gear shift clutch 58 to move between the connection position and the disconnection position, whereby loss of power from the counter shaft 44 is reduced. In response to detection of establishment of the speed stage by the potentiometer 72, the shift spindle 74 returns to the initial angle position.

In this state, ignition in the internal combustion engine 25, which supplies power to the crankshaft 26, is cut in shifting up. To cut ignition, supply of electric power to the ignition plug 32 is stopped. As a result, although the clutch lifter 65 does not yet reach the disconnection position, power that is supplied from the crankshaft 26 is reduced, and transmitted torque is decreased. This facilitates extraction and insertion of the dowel in the gear train for speed stage. Alternatively, instead of cutting ignition, the injection amount of fuel may be reduced in the internal combustion engine 25. The cut of ignition and the reduction of the injection amount may be performed together.

Figure 8F:
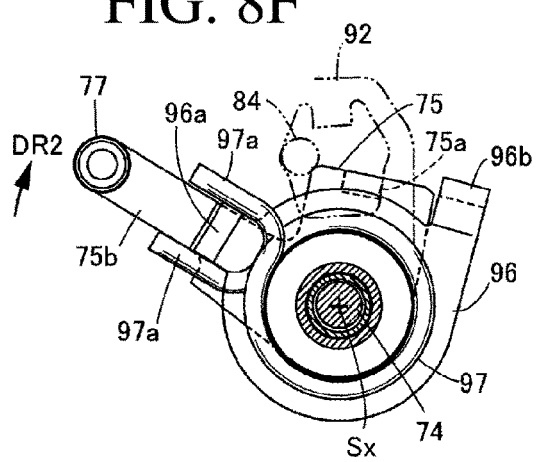
Figure 8D:
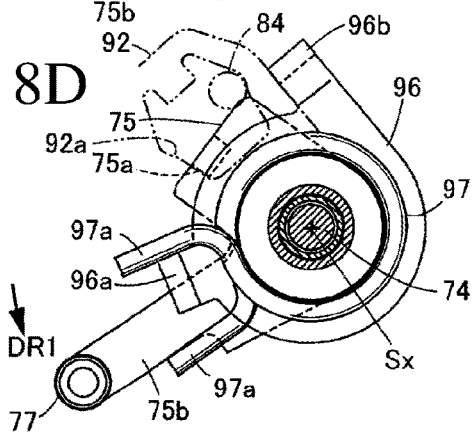

When the shift arm 75 further rotates in the first circumferential direction DR1 around the shaft center Sx of the shift spindle 74, as shown in FIG. 8D, the clutch lifter lever 76 further swings in the third circumferential direction DR3. Then, the clutch lifter 65 reaches the disconnection position. This releases joining between the first friction plates 59 and the second friction plates 61, and transmission of torque between the main shaft 43 and the counter shaft 44 is interrupted. The engaging piece 75a of the shift arm 75 comes into contact with the engaging piece 92a of the master arm 92. The support arm 96 provides a driving force around the shaft center Sx of the shift spindle 74, to the master arm 92 in accordance with a driving force applied to the shift spindle 74. Then, the master arm 92 swings, and a rotation force is thereby applied to the shift drum 67. As a result, the dowel is extracted or inserted in the gear train for the speed stage. Thus, when the extraction or insertion of the dowel is not completed in the half-clutch state, the shift spindle 74 drives the clutch lifter 65 to the disconnection position. This results in disconnection of the gear shift clutch 58 and completes extraction or insertion of the dowel. The gear shift operation of the multistage transmission 42 is thus completed. In response to detection of establishment of the speed stage by the potentiometer 72, the shift spindle 74 returns to the initial angle position.

As shown in FIG. 8E, the shift arm 75 rotates in the second circumferential direction DR2 around the shaft center Sx of the shift spindle 74 in shifting down. Meanwhile, the clutch lifter lever 76 swings in the fourth circumferential direction DR4. Then, the clutch lifter 65 reaches the disconnection position. This releases joining between the first friction plates 59 and the second friction plates 61, and transmission of torque between the main shaft 43 and the counter shaft 44 is interrupted. At this time, the engaging piece 75a of the shift arm 75 comes into contact with the master arm 92 after moving by a predetermined play angle. While the shift arm 75 rotates by the play angle, the clutch lifter 65 reaches the disconnection position.

As shown in FIG. 8F, upon further rotating in the second circumferential direction DR2 around the shaft center Sx of the shift spindle 74, the shift arm 75 applies a driving force around the shaft center Sx of the shift spindle 74 to the master arm 92 in accordance with the driving force applied to the shift spindle 74. Then, the master arm 92 swings, and a rotation force is thereby applied to the shift drum 67. At this time, the support arm 96 does not transmit power to the master arm 92. As a result, the dowel is extracted or inserted in the gear train for the speed stage. The gear shift operation of the multistage transmission 42 is thus completed. In response to detection of establishment of the speed stage by the potentiometer 72, the shift spindle 74 returns to the initial angle position.

In this embodiment, the throttle valve 38 is provided in an intake path (the flow path 37a of the throttle body 37) of the internal combustion engine 25. The throttle valve 38 is coupled to the right grip 23, which is used for throttle operation, by a wire. This configuration is inexpensive but can reduce the time of the gear shift operation.

The gear shift control system 42a of this embodiment includes the shift arm 75, the master arm 92, and the torsion spring 97. The shift arm 75 is fixed to the shift spindle 74 so as to swing around the shaft center Sx of the shift spindle 74 and is coupled directly to the clutch lifter lever 76, which is coupled to the clutch lifter 65. The master arm 92 is supported in the manner swingable around the shaft center Sx of the shift spindle 74 and causes rotation of the shift drum 67. The torsion spring 97 has the elasticity that provides a driving force for following swing of the shift arm 75, to the master arm 92. When the shift spindle 74 rotates, the shift arm 75 swings accordingly, and the clutch lifter lever 76 starts to drive the clutch lifter 65. While the master arm 92 receives the driving force from the torsion spring 97, rotation of the shift drum 67 is prevented, and the master arm 92 is restrained from swinging, unless the driving force of the torsion spring 97 exceeds the joining force of the dowel. In this situation, the shift spindle 74 continues to rotate further, and the clutch lifter 65 also rotates further. This results in accumulation of an elastic force in the torsion spring 97 in accordance with rotation of the shift spindle 74. Then, transmission of torque between the first friction plates 59 and the second friction plates 61 is reduced as the clutch lifter 65 is displaced. The elastic force that is accumulated in the torsion spring 97 comes to exceed the joining force of the dowel, whereby the shift drum 67 starts to rotate. Thus, the gear shift operation is rapidly completed after the clutch comes to the half-clutch state.

In this embodiment, the support arm 96 comes into contact with the master arm 92 by receiving the elastic force of the torsion spring 97 when the shift spindle 74 rotates in the first circumferential direction DR1 around the shaft center Sx in shifting up. On the other hand, the shift arm 75 comes into contact with the master arm 92 after moving by the predetermined play angle, when the shift spindle 74 rotates in the second circumferential direction DR2 around the shaft center Sx in shifting down. At this time, the support arm 96 does not come into contact with the master arm 92. The shift drum 67 rotates by the elastic force accumulated in the torsion spring 97 in shifting up. The gear shift operation is rapidly completed after the clutch comes to the half-clutch state. While the torque required to extract or insert the dowel increases in accordance with back torque in shifting down, it is difficult to reduce the back torque at a desired timing without operation of a passenger. In view of this, the shift drum 67 is configured to rotate after the clutch lifter 65 reaches the disconnection position. This structure reduces the burden on the components such as the dowel and the shifter in performing the gear shift operation.

REFERENCE SIGNS LIST

16 . . . power transmission apparatus (power unit),
23 . . . operation member (right grip),
25 . . . internal combustion engine,
26 . . . crankshaft,
37a . . . intake path (flow path),
38 . . . throttle valve,
43 . . . main shaft,
44 . . . counter shaft,
47 . . . shifter (first shifter),
49 . . . shifter (second shifter),
54 . . . shifter (third shifter),
58 . . . clutch (gear shift clutch),
59 . . . first friction plate,
61 . . . second friction plate,
65 . . . clutch lifter,
67 . . . shift drum,
73 . . . electric motor,
74 . . . shift spindle,
75 . . . shift arm,
76 . . . clutch lifter lever,
92 . . . master arm,
96 . . . transmission body (support arm),
97 . . . lost motion elastic body (torsion spring),
Cx . . . second rotation axis (rotation axis of the counter shaft 44),
DR1 . . . first direction (first circumferential direction),
DR2 . . . second direction (second circumferential direction),
Mx . . . first rotation axis (rotation axis of the main shaft 43),
Sx . . . rotation axis (shaft center of the shift spindle 74).

What is claimed is:

1. A power transmission apparatus comprising:
    a main shaft configured to rotate on a first rotation axis;
    a counter shaft configured to rotate on a second rotation axis parallel to the first rotation axis;
    a shift drum configured to rotate to drive a shifter of at least one of the main shaft or the counter shaft and to make a dowel be extracted or inserted so that a shift gear is relatively non-rotatably joined to the at least one of the main shaft or the counter shaft, thereby selectively establishing a speed stage between the main shaft and the counter shaft;
    a clutch including driving-side first friction plates and driven-side second friction plates, the first friction plates rotatably supported around the main shaft and configured to rotate by power that is transmitted from a crankshaft, the second friction plates disposed alternately with the first friction plates and relatively non-rotatably supported by the main shaft;
    a clutch lifter configured to be displaced between a connection position and a disconnection position, the clutch lifter at the connection position configured to make the first friction plates and the second friction plates be mutually pressed so as to transmit power at the maximum, the clutch lifter at the disconnection position configured to make the first friction plates and the second friction plates be mutually separated so as to disconnect transmission of the power;
    a shift spindle configured to rotate in accordance with a driving force supplied from an electric motor and thereby apply a driving force to the clutch lifter; and
    a transmission body configured to transmit a driving force to the shift drum in accordance with rotation of the shift spindle while the clutch lifter moves from the connection position to the disconnection position.

2. The power transmission apparatus according to claim 1, wherein the shift spindle is configured to drive the clutch lifter to the disconnection position.

3. The power transmission apparatus according to claim 1, wherein ignition is cut in an internal combustion engine that supplies power to the crankshaft, in rotating the shift drum.

4. The power transmission apparatus according to claim 1, wherein an injection amount of fuel is reduced in the internal combustion engine that supplies power to the crankshaft, in rotating the shift drum.

5. The power transmission apparatus according to claim 3, further comprising a throttle valve provided to an intake path of the internal combustion engine and coupled to an operation member to be used for throttle operation, by a wire.

6. The power transmission apparatus according to claim 1, further comprising:
    a shift arm fixed to the shift spindle so as to swing around a rotation axis of the shift spindle and coupled directly to a clutch lifter lever that is coupled to the clutch lifter;
    a master arm supported in a manner swingable around the rotation axis of the shift spindle and configured to cause rotation of the shift drum; and
    a lost motion elastic body having an elasticity that provides a driving force for following swing of the shift arm, to the master arm.

7. The power transmission apparatus according to claim 6, wherein the transmission body is configured to come into contact with the master arm by receiving an elastic force of the lost motion elastic body, when the shift spindle rotates in a first direction around the rotation axis in shifting up, and the shift arm is configured to come into contact with the master arm after moving by a predetermined play angle, when the shift spindle rotates in a second direction opposite to the first direction, around the rotation axis in shifting down.

8. The power transmission apparatus according to claim 2, wherein ignition is cut in an internal combustion engine that supplies power to the crankshaft, in rotating the shift drum.

9. The power transmission apparatus according to claim 2, wherein an injection amount of fuel is reduced in the internal combustion engine that supplies power to the crankshaft, in rotating the shift drum.

10. The power transmission apparatus according to claim 3, wherein an injection amount of fuel is reduced in the internal combustion engine that supplies power to the crankshaft, in rotating the shift drum.

11. The power transmission apparatus according to claim 4, further comprising a throttle valve provided to an intake path of the internal combustion engine and coupled to an operation member to be used for throttle operation, by a wire.

12. The power transmission apparatus according to claim 2, further comprising:
- a shift arm fixed to the shift spindle so as to swing around a rotation axis of the shift spindle and coupled directly to a clutch lifter lever that is coupled to the clutch lifter;
- a master arm supported in a manner swingable around the rotation axis of the shift spindle and configured to cause rotation of the shift drum; and
- a lost motion elastic body having an elasticity that provides a driving force for following swing of the shift arm, to the master arm.

13. The power transmission apparatus according to claim 3, further comprising:
- a shift arm fixed to the shift spindle so as to swing around a rotation axis of the shift spindle and coupled directly to a clutch lifter lever that is coupled to the clutch lifter;
- a master arm supported in a manner swingable around the rotation axis of the shift spindle and configured to cause rotation of the shift drum; and
- a lost motion elastic body having an elasticity that provides a driving force for following swing of the shift arm, to the master arm.

14. The power transmission apparatus according to claim 4, further comprising:
- a shift arm fixed to the shift spindle so as to swing around a rotation axis of the shift spindle and coupled directly to a clutch lifter lever that is coupled to the clutch lifter;
- a master arm supported in a manner swingable around the rotation axis of the shift spindle and configured to cause rotation of the shift drum; and
- a lost motion elastic body having an elasticity that provides a driving force for following swing of the shift arm, to the master arm.

15. The power transmission apparatus according to claim 5, further comprising:
- a shift arm fixed to the shift spindle so as to swing around a rotation axis of the shift spindle and coupled directly to a clutch lifter lever that is coupled to the clutch lifter;
- a master arm supported in a manner swingable around the rotation axis of the shift spindle and configured to cause rotation of the shift drum; and
- a lost motion elastic body having an elasticity that provides a driving force for following swing of the shift arm, to the master arm.

* * * * *